United States Patent [19]

Kneale

[11] Patent Number: 6,046,254
[45] Date of Patent: Apr. 4, 2000

[54] ANTIFOG COMPOSITION FOR POLYOLEFIN PACKAGING FILMS

[75] Inventor: Timothy Michael Kneale, Clinton, Iowa

[73] Assignee: E. I. du Pont de Nemours and Company, Wilmington, Del.

[21] Appl. No.: 09/047,599

[22] Filed: Mar. 25, 1998

Related U.S. Application Data

[60] Provisional application No. 60/041,007, Mar. 27, 1997.
[51] Int. Cl.[7] .............................. C08K 5/103; C08K 5/16; B32B 27/08
[52] U.S. Cl. ......................... 523/169; 524/317; 524/306; 524/724; 428/516
[58] Field of Search ............................. 523/169; 524/317, 524/306, 724; 428/516

[56] References Cited

U.S. PATENT DOCUMENTS

| | | | |
|---|---|---|---|
| 3,048,263 | 8/1962 | Socks et al. | 206/45.33 |
| 4,268,583 | 5/1981 | Hendy | 428/516 |
| 4,486,552 | 12/1984 | Niemann | 523/169 |
| 4,654,252 | 3/1987 | Doyen | 428/213 |
| 4,835,194 | 5/1989 | Bright et al. | 523/169 |

*Primary Examiner*—James J. Seidleck
*Assistant Examiner*—Olga Asinovsky
*Attorney, Agent, or Firm*—Patricia L. Kelly

[57] ABSTRACT

A fog-resistant polyolefin packaging film is prepared by producing a film of a formulation comprising ethylene or a polypropylene polymer, having incorporated therein and an antifog agent comprising: a) a C8 or higher ester, diester, and/or triester of a C2 to C8 polyhydric alcohol; and b) a mono-or dialkoxylated C10 or higher amine. In a preferred embodiment, said film further comprises c) an alkoxylated alkylphenol or derivatives thereof. Said antifog agent is present in an amount which imparts antifog resistance performance to said film in about less than an hour.

17 Claims, No Drawings

ANTIFOG COMPOSITION FOR POLYOLEFIN PACKAGING FILMS

This application claims the benefit of U.S. Provisional Application No. 60/041,007, filed Mar. 27, 1997.

FIELD OF THE INVENTION

The present invention relates to novel anti-fogging blend compositions for use with food packaging films comprised of polyolefins, a process for preparing these packaging films, and fog-resistant films produced therefrom.

BACKGROUND OF THE INVENTION

Polymeric films such as cellophane, oriented polypropylene, blown polyethylene, polyvinyl chloride (PVC), and a multitude of others which comprise polymers of low surface energy, have been used for decades in the packaging of a wide variety of goods. These films are characterized by high resistance to moisture vapor transmission, making them desirable in the packaging of moist products, such as meats, vegetables, prepared food products, etc., because the moisture content of the food is substantially retained in the package. Another desirable property of the films is their transparency, enabling the visual identification of the food products packaged within. However, when saturating water evaporates from moist food, it may saturate the air spaces between the film and the food and begin condensing on the inner surface of the film as minute droplets of water. As more condensation or water droplets form on the film, an overall fogged effect is observed, interfering with the see-through quality of the film.

In order to prevent water from condensing in droplets, an antifog agent is often added to the film. The antifog agents raise the surface energy of the film and/or reduce the surface tension of the water and cause the water to form a continuous sheet, which is then transparent. A great number of antifog agents have been suggested as additives to films, for example various glyceryl esters of fatty acids have been disclosed in U.S. Pat. No. 3,048,263 as antifogging agents for polyolefin films in an amount between 0.5 percent to 1 percent by weight. U.S. Pat. No. 4,835,194 discloses the use of certain ethoxylated nonyl- or decylphenols in linear ethylene polymers. U.S. Pat. No. 4,486,552 discloses an anti-fog blend of glyceryl esters, alkoxylated alkylphenols, and polyalkoxylated fatty acid esters. The prior art antifog agents all take some time before they take effect and become noticeable.

There is a perceived need in the market place for polymeric films with improved fog-resistant properties.

SUMMARY OF THE INVENTION

An antifog blend for improving the fog resistance characteristics of a film made from polyolefin resins, comprising: a) a C8 or higher ester, diester, and/or triester of a C2 to C8 polyhydric alcohol and b) a mono-or dialkoxylated C10 or higher amine.

In another embodiment of the invention, the antifog blend for improving the fog resistance characteristics of a film further comprises c) an alkoxylated alkylphenol or derivatives thereof.

A fog-resistant polyolefin packaging film prepared by producing a film of a formulation comprising an ethylene or a polypropylene polymer, having incorporated therein and an antifog agent comprising: a) a C8 or higher ester, diester, and/or triester of a C2 to C8 polyhydric alcohol and b) a mono-or dialkoxylated C10 or higher amine. Said antifog agent is present in an amount which imparts antifog resistance performance to said film in about less than an hour.

The invention further relates to a practical method to improve antifog resistant performance of polyolefin packaging films by incorporating into the film resin an antifog agent comprising: a) a C8 or higher ester, diester, and/or triester of a C2 to C8 polyhydric alcohol and b) a mono-or dialkoxylated C10 or higher amine.

In a preferred method for improving antifog resistant performance of polyolefin packaging films by incorporating into the film resin an antifog agent, said antifog agent further comprises c) an alkoxylated alkylphenol or derivatives thereof.

The present invention also relates to a method for improving antifog resistant performance of polyolefin packaging films by coating said films with an antifog blend comprising: a) a C8 or higher ester, diester, and/or triester of a C2 to C8 polyhydric alcohol and b) a mono-or dialkoxylated C10 or higher amine.

DESCRIPTION OF THE INVENTION

The packaging films to be used with the antifog blends of this invention are broadly defined as packaging films comprising one or more polyolefin layers, such as oriented polypropylene, blown polyethylene, shrink polyethylene, stretch polyethylene, cast polypropylene, coextrusions of propylene and ethylene polymers, and the like. Exemplary films for use with the antifog blends of this invention are certain oriented polypropylene products and shrink polyethylene-based film such as Cryovac® RD-106 available from W. R. Grace & Co.

The definition of polyolefin, as intended herein, is a polymer assembled from a significant percentage, preferably 50 weight percent or greater, of one or more olefinic monomers. The definition of copolymer, as intended herein, is a polymer assembled from two or more monomers. Such polymers may include, but are not limited to, polyethylene homopolymers, ethylene-alpha-olefin copolymers, polypropylene alpha-olefin copolymers, polypropylene homopolymers, ethylene-vinyl acetate copolymers, ethylene-methacrylic acid copolymers and their salts, ethylene-styrene polymers, blends of such polymers, and so on. The polymers may be produced by any means, including free radical polymerization (e.g. peroxy compounds), metallocoene catalysis, coordination catalysis (e.g., Ziegler or Natta catalysts or variation thereof), or other technologies.

Unless otherwise noted, the polymeric resins utilized in the packaging films of interest are generally commercially available in pellet form and, as recognized in the art, may be melt blended or mechanically mixed by well-known methods using commercially available equipment including tumblers, mixers, or blenders. The resins may have other additional resins blended therewith along with well-known additives such as processing aids, pigments, etc. The making of polyolefin packaging films is well-known and includes the techniques of casting films as thin sheets through narrow slit dies, and the blown-film techniques wherein an extruded tube of molten polymer is inflated to the desired "bubble" diameter and/or film thickness. In an exemplary process, the resins and additives are introduced into an extruder where the resins are melt plastified by heating and then transferred to an extrusion die for formation into a film tube. Extrusion and die temperatures will generally depend upon the particular resin being processed and suitable temperature ranges are generally known in the art or provided in technical bulletins made available by resin manufacturers. Processing temperatures may vary depending upon process parameters chosen.

Polyolefin packaging films of special interest are stretch and heat shrink films comprising polymers of ethylene, used for the packaging of foodstuffs, particularly protein products. The ethylene polymer is preferably of the linear low-density type ("LLDPE"). The LLDPE films of this invention are typically 4 to 150 microns in thickness, with a thickness of 8 to 40 microns preferred. Films may optionally be crosslinked by any means, with electron beam crosslinking preferred. These LLDPE polymeric films are recognized as having excellent strength and resistance to tearing or puncturing when stressed against articles having protuberances.

The antifog agent of the present invention, for addition to the polyolefin resin of the packaging films, is a blend of the followings, based on weight of the polyolefin resin into which the components are blended:

1) About 0.05 to about 2.0 parts per hundred parts (pph) resin, preferably about 0.2 to about 1.0 pph of a first component selected from a C8 or higher esters, diesters, and triesters of C2 to C8 polyhydric alcohols or blends thereof. Preferred alcohols are glycerol and sorbitol. Preferred C8 or higher compounds are oleic and stearic acid. Most preferred is a blend of glyceryl monostearate and glyceryl monooleate.

2) About 0.01 to about 1.0 pph of a second component selected from mono-or dialkoxylated C10 or higher amines, preferably amines having the formula $RN((O(CH2)a)b)2$, where R is a C10 or above alkyl, a is 2 to 4, and b is 1 or more, or blends thereof. Preferred R is derived from stearic acid, tallow or coconut oil. Degree of alkoxylation (b) may range from 1 to about 20. A diethoxylate of degree 1 is preferred.

3) About 0.01 to about 1.0 pph of a third component selected from alkoxylated alkylphenols or derivatives thereof. Most preferred are ethoxylates of degree 2 to about 100; octyl- or nonylphenols; and phosphate esters of ethoxylated alkylphenol sold by Rhone-Poulenc under the trade name Rhodafac® RE-610.

The total amount of the antifog blend of the present invention to be added to the packaging film is in the range between about 0.1% to about 4% based on weight of the polyolefin resin, and most preferably an amount in the range of about 0.5% to about 3%. The components preferably are present in a ratio (based on weight) of Component 1 to Component 2 to Component 3 of from about 20:2:1 to about 2:1:1, preferably about 10:1:1 to about 5:1:1. The rates of use of the above materials may be adjusted as needed to balance cost and various film properties. For example, film slip may be improved by using relatively more glyceryl monostearate or preferred amine. Meanwhile, antifogging of films wrapping red meat may be improved with increased levels of amine and alkylphenol compounds.

The antifog compounds of this invention may be applied to the surface of the film by coating processes well known in the art, such as spraying, gravure, rod, roll, or the like. Solvents, diluents, and adjuvants may be used in these processes as desired. The compounds may also be applied to the films by incorporating them directly into the polymeric materials of one or more layers of the film by compounding, blending, injection, or other suitable means known in the art prior to forming the film. It would also be possible to use more than one of the above methods for one or more of the antifog blends of the invention. That is to say, one or more of the components may be incorporated into the resin prior to making the film and the one or more others may be coated onto the surface The antifog blend of the present invention is preferably added to the polyolefin resin before the film is made instead of applying it as a coating. The incorporation of the blend into the resin is less expensive, less labor intensive, and more consistent than coatings applied to the surface of the film. If the blend is added to the polyolefin resin, the mixing of the agents into the polyolefin resin is done by mixing it into molten polymer by commonly used techniques such as roll-milling, mixing in a Banbury type mixer, or mixing in an extruder barrel and the like. The mixing time can be shortened by mixing the antifog agent with unheated polymer particles so as to achieve substantially even distribution of the agent in the mass of polymer, thereby reducing the amount of time needed for intensive mixing at molten temperature. The most preferred method is to compound the agents with polyolefin in a twin-screw extruder to form concentrates which are then blended with the resins of the film structure immediately prior to extrusion.

Conveniently, the antifog agents of the present invention can also be added substantially or simultaneously or sequentially with any other additives or surfactants to the packaging films, i.e., colorants, tackifiers, slip agents, anti-static agents, block agents and the like. The antifog agents may also be pre-blended with other additives and the blend then added to the polymer. It is contemplated that in some instances, the antifog blend of the present invention should have the additional benefit of aiding or enhancing the properties of other additives or surfactants.

The antifog blend of the present formulations is also suitable for films made by coextrusion fabrication wherein two or more films comprise a multi-layer structure. The antifog agents of the present invention can exude through an adjacent film layer to the packaging film which does not contain the antifog agent, thereby rendering the adjacent layer resistant to fogging.

The antifog agents of this invention provide antifog performance to the polyolefin packaging films. The antifog materials are believed to bloom to the surface of the films so as to provide the antifog properties desired within a surprisingly short period of time of one hour or less. Antifog performance is manifested by an increase in surface tension at the film surface, hence the tendency of water to form a more transparent layer on a film's inner surfaces than would be expected without the presence of the compounds. It should be noted that antifog agents that can be easily removed by water or abrasion from the surface of the film are not desirable, and the film would not be fog resistant after an extended period of time such as a few days. The effect of not including the antifog agents, or antifog agents being removed from the film, is water condensing on the film's inner surfaces as minute droplets of water.

For the purpose of this invention, antifog performance is rated as described in Table 1, except as elsewhere noted. A zero denotes no antifogging performance, while a ten is a best possible score and indicates moisture cannot be seen on the film under normal viewing conditions. A score of two or above is generally needed for a film to have commercial food packaging utility, while five or higher is preferred and eight or above is especially desirable. The appearance distinction between films having a score grade difference of 1, e.g., between a two and a three, is clearly noticeable.

TABLE 1

| | |
|---|---|
| 0 | Fine fog across entire surface. Difficult to view product. |
| 2 | Small droplets (1–2 mm). Product somewhat obscured. |
| 4 | Medium droplets (2–4 mm). |
| 6 | Large drops (>4 mm). |
| 8 | Moisture visible but fairly uniform w/some texture or large drops. |
| 10 | Indistinguishable from dry film over entire package. |

The following examples are to illustrate some particular embodiments, but the present invention is not limited to the particular ones being illustrated.

EXAMPLES

In all examples, a blend of ethylene polymers was melt blend on the roll mill with an antifog agent. The blend comprises in weight percent: a) 55% ethylene-octene ULDPE having a density of 0.912 g/cc and a melt index of 1.0 dg/min measured in accord with ASTM 1238, condition D, employing 2.16 kilograms at 190° C., available from Dow Chemical Company of Midland, Mich., USA as Dow Attane® 4201; b) 20% low density polyethylene with a 0.923 g/cc density and a melt index of 1.9 dg/min, also available from Dow Chemical as Dow® 503I or 503A; c) 17% ethylene-octene LLDPE with a 0.920 g/cc density and a melt index of 1 dg/min, available as Dowlex® 2045A from Dow Chemical; and d) 8% ethylene-vinyl acetate (EVA) having a density of 12% VA and a melt index of 0.35 dg/min, available as Elvax® 3135X from E.I. du Pont de Nemours and Company of Wilmington, Del., U.S.A. ("DuPont"). EVA polymers are typically classified by vinyl acetate weight percentage, rather than density.

The antifog agent melt blended with the polyethylene resin is either a control antifog agent, some as disclosed in the prior art, or blends of the present invention comprising: a) a glyceryl ester of fatty acids; b) an amine; and c) an alkoxylated akylphenol-comprising compound. The control and test antifog agents of the examples are blends containing additives from the following list:

GMS: 95% a-glyceryl monostearate available from American Ingredients of Kansas City, Mo., U.S.A., under the trade name Pationic® 901;

GMO: 90% a-glyceryl monooleate, available from Grinsted Products A/S of Copenhagen, Denmark under the trade name Danisco® MO90;

BHETA: N,N'-bis(2-hydroxyethyl)tallowamine, commercially available from Akzo Nobel Inc., Chicago, Ill., U.S.A., as Armostat® 310;

PEAPE: a mixed $PO_4$ ester of ethoxylated alkylphenol, available from Rhone-Poulenc Basic Chemicals Co., Shelton, Conn., U.S.A. under the trade name of Rhodafac® RE-610;

OPE: 5 mole ethoxylate of octylphenol, also available from Rhone-Poulenc as Igepal® CA-520;

NPE: 4 mole ethoxylate of nonylphenol, also available from Rhone-Poulenc as Igepal® CO-430;

ERUC: erucamide, which is cis-13-docosenamide, available from Witco Corp., Greenwich, Conn., U.S.A. as Kemamide® E.

Films employing antifog agents containing the above additives were formulated at various thicknesses using a double bubble orientation process of the type described in U.S. Pat. No. 3,456,044. In this process, the primary tube leaving the annular die is inflated by admission of air, cooled, collapsed, then oriented by reinflating to form a secondary bubble with reheating to the film's orientation temperature which is generally above the softening point and below the melting point of the blend components. Machine direction (MD) was produced by drawing the film tube through two pairs of rollers traveling at different speeds, and transverse direction (TD) orientation is obtained by radial bubble orientation. The resulting film had about a 4MD×5TD orientation ratio and was between about 20 to about 25 microns thick. Control film examples for comparison purpose include films containing antifog agents similar to those taught in the prior art, U.S. Pat. Nos. 3,048,263, 4,835,194, and 4,486,552.

Each film was tested for antifog performance by first wrapping the film around several test meat trays in a standard L-bar heat sealer, exposing the packages to hot air to cause shrinkage of the oriented film, and then placing the finished packages in a refrigerated open case with temperature set at 32° F. as might be found in a supermarket. After about an hour and at fixed time intervals afterward for the next seventy two hours, the wrapped meat packages were closely observed by the same scoring technician and graded per numeric ratings in Table 1, with grade increments of 0.5. The ratings for wrapped packages were then averaged and reported for each type of film.

The films employing the blends of the present invention showed fog resistant characteristics which were of surprising superiority and unexpected effectiveness in a short period of time, as compared to the control examples as well as the films employing antifog agents taught in the prior art. Table 2 lists additive concentrations employed in antifog agents as used in the examples, and the results after the first day for trayed products containing pork chops (bone in pork chops in deep trays with no meat-to-film contact):

TABLE 2

| | Additives used in Antifog Agent in ppm (approximate) | | | | | | | Rating after | | |
|---|---|---|---|---|---|---|---|---|---|---|
| Example | GMS | GMO | BHETA | PEAPE | OPE | NPE | ERUC | 1 hr | 4 hrs | 24 hrs |
| P1* | 3000 | 1500 | — | — | — | — | 150 | 3.0 | 6.0 | 8.5 |
| P2** | 3000 | 1500 | — | 500 | — | — | 150 | 2.5 | 6.0 | 8.0 |
| P3 | — | — | — | 500 | — | 150 | 1.0 | 1.0 | 1.0 | 1.0 |
| P4 | — | — | — | 4000 | — | — | 150 | 1.0 | 1.0 | 2.0 |
| P5 | 3000 | 1500 | 1000 | — | — | — | 150 | 6.0 | 7.0 | 8.0 |
| P6 | 3000 | 1500 | 500 | 500 | — | — | 150 | 8.0 | 8.0 | 8.0 |
| P7 | 3000 | 1500 | 1000 | 500 | — | — | 150 | 8.0 | 8.0 | 8.5 |
| P8 | 3000 | 1500 | 4000 | 4000 | — | — | 150 | 7.5 | 8.0 | 8.5 |
| P9 | 3000 | 1500 | 500 | — | 500 | — | 150 | 2.0 | 5.0 | 9.0 |
| P10*** | — | — | — | — | — | 4000 | 150 | 0.0 | 1.0 | 2.0 |
| P11 | — | — | 1000 | 500 | — | — | 150 | 0.0 | 2.0 | 1.0 |
| P12 | — | — | 1000 | — | — | — | 150 | 0.0 | 2.0 | 1.0 |

*Film employing the antifog agent taught in U.S. Pat. No. 3,048,263 with total of .45% glyceryl ester.
**Film employing the antifog agent taught in U.S. Pat. No. 4,486,552, for an antifog agent comprising glyceryl ester and an ethoxylated alkylphenol.
***Film employing the antifog agent taught in U.S. Pat. No. 4,835,194, for an antifog agent comprising a certain ethoxylated alkylphenol.

The examples were repeated with boneless chicken breasts in shallow trays, and the results confirmed the surprising superiority of the antifog agents of the present invention, with unexpected effectiveness in a short period of time as shown in Table 3:

TABLE 3

| Example | \multicolumn{7}{c}{Additives used in Antifog Agent in ppm (approximate)} | | | | | | | Rating after | | |
|---|---|---|---|---|---|---|---|---|---|---|
| | GMS | GMO | BHETA | PEAPE | OPE | NPE | ERUC | 1 hr | 4 hrs | 24 hrs |
| C1* | 3000 | 1500 | — | — | — | — | 150 | 2.0 | 6.0 | 7.5 |
| C2** | 3000 | 1500 | — | 500 | — | — | 150 | 4.5 | 5.0 | 8.0 |
| C3 | — | — | — | 500 | — | — | 150 | 4.0 | 3.0 | 2.5 |
| C4 | — | — | — | 4000 | — | — | 150 | 3.0 | 3.0 | 2.0 |
| C5 | 3000 | 1500 | 1000 | — | — | — | 150 | 7.0 | 7.5 | 8.0 |
| C6 | 3000 | 1500 | 500 | 500 | — | — | 150 | 8.0 | 5.0 | 6.5 |
| C7 | 3000 | 1500 | 1000 | 500 | — | — | 150 | 8.0 | 8.0 | 6.5 |
| C8 | 3000 | 1500 | 4000 | 4000 | — | — | 150 | 8.0 | 8.5 | 8.5 |
| C9 | 3000 | 1500 | 500 | — | 500 | — | 150 | 8.0 | 8.5 | 8.5 |
| C10*** | — | — | — | — | — | 4000 | 150 | 1.0 | 3.0 | 4.0 |
| C11 | — | — | 1000 | 500 | — | — | 150 | 0.5 | 2.5 | 2.5 |
| C12 | — | — | 1000 | — | — | — | 150 | 7.5 | 4.0 | 3.5 |

*Film employing the antifog agent taught in U.S. Pat. No. 3,048,263 with total of .45% glyceryl ester.
**Film employing the antifog agent taught in U.S. Pat. No. 4,486,552, for an antifog agent comprising glyceryl ester and an ethoxylated alkylphenol.
***Film employing the antifog agent taught in U.S. Pat. No. 4,835,194, for an antifog agent comprising a certain ethoxylated alkylphenol.

The experiments were continued for two more days to evaluate the long-term effectiveness of the antifog agents of the present invention. The antifog agents were still effective after an extended period of time. The results are presented as follows:

TABLE 4

| Example | \multicolumn{5}{c}{Rating After} | | | | |
|---|---|---|---|---|---|
| | 1 hr | 4 hrs | 24 hrs | 48 hrs | 72 hrs |
| P1* | 2.5 | 6.0 | 8.0 | 8.0 | 8.0 |
| P2** | 2.5 | 6.0 | 8.0 | 8.0 | 8.0 |
| P3 | 1.0 | 1.0 | 1.0 | 1.5 | 0.5 |
| P4 | 1.0 | 1.0 | 2.0 | 2.5 | 1.0 |
| P6 | 8.0 | 8.0 | 8.0 | 8.0 | 8.0 |
| P8 | 7.5 | 8.0 | 8.5 | 8.5 | 8.0 |
| P9 | 2.0 | 5.0 | 9.0 | 9.0 | 8.5 |
| C1* | 1.0 | 1.5 | 7.5 | 7.5 | 7.0 |
| C2** | 4.5 | 5.0 | 8.0 | 8.0 | 8.0 |
| C3 | 4.0 | 3.0 | 2.5 | 2.5 | 3.5 |
| C4 | 3.0 | 3.0 | 2.0 | 3.5 | 2.5 |
| C6 | 8.0 | 5.0 | 6.5 | 6.5 | 8.0 |
| C8 | 8.0 | 8.5 | 8.5 | 8.5 | 8.0 |
| C9 | 8.0 | 8.5 | 8.5 | 9.0 | 8.0 |

*Film employing the antifog agent taught in U.S. Pat. No. 3,048,263 with total of .45% glyceryl ester.
**Film employing the antifog agent taught in U.S. Pat. No. 4,486,552, for an antifog agent comprising glyceryl ester and an ethoxylated alkylphenol.

As described herein, the antifog agents of the present invention are of special utility in improving antifog performance of polyolefin films. While forms of the invention have been illustrated and described, modifications can be made without departing from the spirit and scope of the invention. Accordingly, it is not intended that the invention be limited thereby.

I claim:

1. A packaging film resistant to fogging upon exposure to a humid atmosphere, comprising:
   a) a polyolefin material, and
   b) an antifog agent including: i) a C8 or higher ester, diester, and/or triester of a C2 to C8 polyhydric alcohol, ii) a mono-or dialkoxylated C10 or higher amine and iii) an alkoxylated alkylphenol or derivatives thereof.

2. The film of claim 1, wherein said polyolefin material comprises a material selected from the group consisting of: low density polyethylene, high density polyethylene, linear low density ethylene copolymer, blends of linear low density ethylene copolymer with low density branched polythylene, blends of linear low density ethylene copolymer with high density linear polymer, polypropylene, and propylene alpha-olefin copolymer.

3. The film of claim 1, wherein said antifog agent is present in an amount sufficient to impart resistance to moisture fogging to said film in about less than an hour.

4. The film of claim 1, wherein said antifog agent is present in the following level, based on weight percent of said polyolefin material:
   a) said C8 or higher ester, diester, and/or triester of a C2 to C8 polyhydric alcohol is about 0.05 to about 2.0%;
   b) said mono-or dialkoxylated C10 or higher amine is about 0.01 to about 1%; and
   c) said alkoxylated alkylphenol or salt is about 0.01 to about 1%.

5. The film of claim 4, wherein said antifog agent is present in an amount of about 0.1% to 4% by weight of said polyolefin material.

6. A substantially transparent film resistant to fogging upon exposure to a humid atmosphere, having incorporated therein an antifog agent comprising:
   a) a component A of a C8 or higher ester, diester, and/or triester of a C2 to C8 polyhydric alcohol;
   b) a component B of a mono-or dialkoxylated C10 or higher amine; and
   c) a component C of an alkoxylated alkylphenol or derivatives thereof;
wherein said antifog agent being present in an amount sufficient to impart resistance to moisture fogging to said film in about less than an hour.

7. The film of claim 6, wherein said antifog agent is present in the following level, based on weight percent of said polyolefin film:
   a) said C8 or higher ester, diester, and/or triester of a C2 to C8 polyhydric alcohol is about 0.05 to about 2.0%;
   b) said mono-or dialkoxylated C10 or higher amine is about 0.01 to about 1.0%; and
   c) said alkoxylated alkylphenol or salt is about 0.01 to about 1.0%.

8. The film of claim 6, wherein the weight ratio of Component A to Component B to Component C is about 20:2:1 to about 2:1:1.

9. A process for making a substantially transparent film having improved fog resistance characteristics, said process comprising the steps of:

a) melt blending a polyolefin material with an antifog agent comprising: i) a C8 or higher ester, diester, and/or triester of a C2 to C8 polyhydric alcohol, ii) a mono-or dialkoxylated C10 or higher amine, and iii) an alkoxylated alkylphenol or derivatives thereof; and b) forming a film therefrom.

10. A process for improving the fog resistance of a film comprising polyolefin resin, said process comprising the step of coating said polyolefin film with an antifog blend, wherein said antifog blend comprises:

a) a C8 or higher ester, diester, and/or triester of a C2 to C8 polyhydric alcohol;

b) a mono-or dialkoxylated C10 or higher amine; and c) an alkoxylated alkylphenol or derivatives thereof;

and wherein said antifog agent is present in an amount sufficient to impart resistance to moisture fogging to said film in about less than an hour.

11. An antifog blend for use with polyolefin packaging film comprising:

a) a component A of a C8 or higher ester, diester, and/or triester of a C2 to C8 polyhydric alcohol;

b) a component B a mono-or dialkoxylated C10 or higher amine; and c) a component C of an alkoxylated alkylphenol or derivatives thereof.

12. The antifog blend of claim 11, wherein said components are blended at the following levels, based on weight of the polyolefin resin:

a) component A at about 0.05 to about 2.0 parts per hundred parts (pph);

b) component B at about 0.01 to about 1 pph; and c) component C at about 0.01 to about 1 pph.

13. The antifog blend of claim 11, wherein the weight ratio of component A to Component B to component C is about 20:2:1 to about 2:1:1.

14. The antifog blend of claim 11, wherein the weight ratio of component A to Component B to component C is about 10:1:1 to about 5:1:1.

15. An oriented film comprising the composition of claim 1.

16. A heat-shrink film comprising the composition of claim 1.

17. A cross-linked film comprising the composition of claim 1.

* * * * *